Patented Sept. 4, 1951

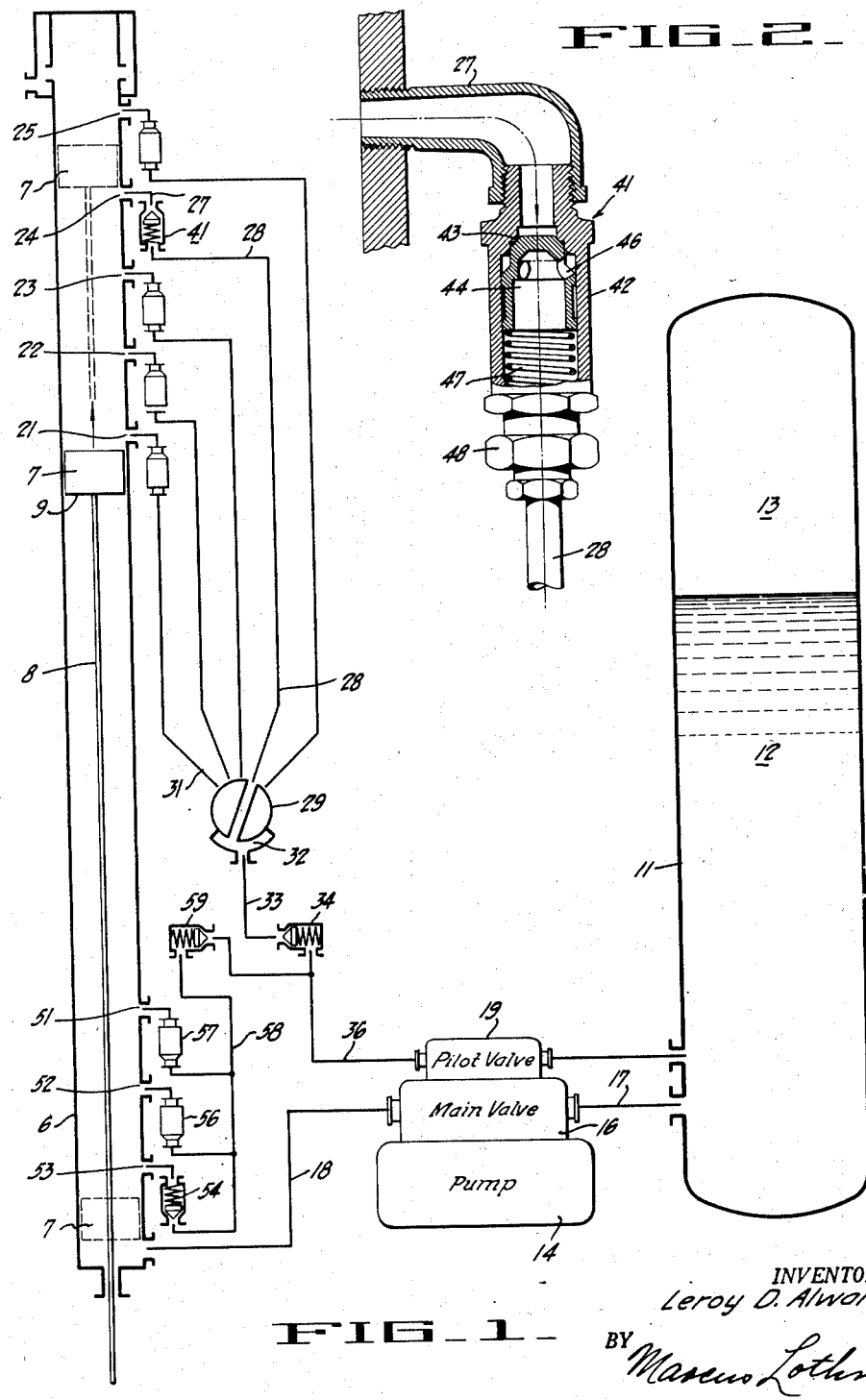

2,566,295

UNITED STATES PATENT OFFICE 2,566,295

HYDRAULIC PUMPING JACK

Leroy D. Alward, Albany, Calif., assignor to The Pelton Water Wheel Company, San Francisco, Calif., a corporation of California Application November 22, 1948, Serial No. 61,479

1 Claim. (Cl. 121—158)

My invention relates to means for operating a pump disposed at a considerable distance from the operating structure and is particularly concerned with a pumping jack in which the valves and other controlling instrumentalities are of a hydraulic nature. A jack of this variety is shown in the co-pending application of Ira Morgan White, filed August 5, 1946, Serial No. 688,498, and assigned to the assignee of this application.

In a hydraulic pumping jack of the mentioned type, the piston reciprocates within a cylinder under the control of a hydraulically actuated valve for governing the flow from a balancing tank through a main pump into the cylinder and in the reverse direction from the cylinder through the pump back to the balancing tank. The events of the piston stroke, that is, the point in the stroke at which the piston starts upwardly, and the point in the stroke at which the piston starts downwardly, are governed by the uncovering by the piston of ports in the cylinder so that the momentary cylinder pressure is exerted through hydraulic conduits upon the control valve. In relatively large installations the cylinder is quite long and the hydraulic conduits connecting the cylinder ports with the controlling instrumentality are likewise relatively long. In practice, serious difficulty has been encountered with breakage of the hydraulic control conduits apparently due to "water hammer" or the phenomenon usually so described, that is to say one or more surges of momentarily excessive pressure.

It is therefore an object of my invention to provide a hydraulic pumping jack in which the hydraulic control conduits are not subjected to disruptive forces.

Another object of the invention is to provide a hydraulic pumping jack in which the flow in the hydraulic control conduits is itself controlled to preclude breakage.

Another object of the invention is in general to improve hydraulic pumping jacks.

A further object of the invention is to provide a hydraulic pumping jack of substantially the customary arrangement but in which means are provided for obviating hydraulic tubing failure due to the phenomenon of "water hammer."

Another object of the invention is to provide a hydraulic pumping jack in which the hydraulic control conduits are maintained substantially supplied with control liquid at all times.

Other objects together with the foregoing are attained in the embodiment of the invention disclosed in the following description and illustrated in the accompanying drawing in which Figure 1 is a diagram of a hydraulic pumping jack constructed in accordance with my invention, the parts being illustrated largely by conventional symbols and parts of the device being shown in cross-section.

Figure 2 is an enlarged detail showing in its closed position one of the check valves utilized in the control conduits.

In its preferred form, the hydraulic pumping jack of my invention comprises a cylinder having an operating piston reciprocable therein in accordance with the supply of oil to or the withdrawal of oil from the cylinder beneath the piston. The flow of oil to the cylinder is controlled by a valve responsive to pressure conditions within the cylinder because it is connected thereto by relatively long oil conduits. The conduits are provided adjacent the cylinder with check valves to prevent oil flow from the conduits back into the cylinder, in one instance, or from the cylinder back into the conduits, in another instance, and in either case to preclude violent or high velocity flow or pressure surges in the controlling conduits.

The hydraulic pumping jack of my invention can be embodied in numerous different forms and is susceptible to variation in accordance with its particular environment. In the form shown in the drawing, it has worked out quite successfully in overcoming previous defects. In this mechanism there is provided a jack cylinder 6 within which a piston 7 is reciprocable. The piston is fast on a rod 8 extending to a pump, not shown. The cylinder 6 is of relatively great length with respect to its diameter and in an actual instance is many feet long. It is usually installed in a vertical position so that the piston 7 receives the pressure fluid on its under side 9. The pressure fluid is customarily a liquid such as oil contained in a tank 11 of considerable capacity. A body 12 of oil occupies the lower portion thereof, while the upper portion 13 contains, as a cushioning means, air under the same pressure as the oil.

In order to transfer oil from the body 12 into the cylinder 6, there is provided a suitably driven pump 14 controlled by a main valve 16. In one position of the main valve, the pump is effective to withdraw oil from the body 12 through a pipe 17 and to discharge it through a pipe 18 into the cylinder 6 beneath the piston 7 thereby driving the piston upwardly in the cylinder 6. In another position of the main valve 16, the pump 14 is effective to withdraw oil from the cylinder 6 from beneath the correspondingly lowered piston 7 through the pipe 18 and to discharge it through the pipe 17 back to the body 12 of oil within the tank 11.

To operate the main valve so that the piston 7 is reversed in its motion as it reaches the upper portion of the cylinder and again as it reaches the lower portion of the cylinder, there is provided a pilot valve 19 having two extreme positions. When it is in one extreme position, the pilot valve is effective to move the main valve comparably, and when it is in its other extreme position, the pilot valve is effective to move the main valve to a corresponding extreme position. By controlling the pilot valve, the flow of oil to or from the cylinder 6 is controlled.

For this reason there is provided in the cylinder 6 adjacent the upper end thereof and at appropriately spaced intervals a series of ports 21, 22, 23, 24 and 25. These ports and their connections are all alike and have similar functions. A description of one of them consequently applies to the others. For example, the port 24 is connected by a short conduit 27 to a relatively long conduit 28 extending from the upper part of the cylinder 6 downwardly thereof to a master control valve 29 at a convenient location. The conduit 28 normally is of small diameter but is many feet long. The control valve 29 is effective to connect the conduit 28 or any one of the other conduits, such as the conduit 31, for example, to a manifold 32 for communication with a pipe 33 then serving as a continuation of the particular conduit connected. The other conduits, such as 31, are isolated when the conduit 28, for example, is connected. In other words, any one of the conduits can be connected to the pipe 33 to the exclusion of the remaining conduits to render the corresponding port in the cylinder wall solely effective.

Whenever the piston 7 rises above the selected effective port 24, the atmospheric pressure above the piston previously imposed upon the conduit 27 is quickly replaced by a super-atmospheric pressure, that is, the discharge pressure of the pump 14, a pressure great enough to lift the piston 7 and its attendant load. This relatively high pressure is communicated through the conduit 27 and the conduit 28 and also the valve 29 to the manifold 32 from whence it is transmitted to the pipe 33. From this pipe the pressure is exerted through a check valve 34 and is carried through a duct 36 to the pilot valve 19.

The increase in pressure on the pilot valve 19 causes it to change its position and correspondingly to actuate the main valve so that the direction of working fluid flow is reversed. The pump then extracts liquid from the cylinder 6 beneath the piston and the piston descends. As it lowers, it re-covers and passes the port 24 again to expose that port to the atmospheric pressure above the piston. The high pressure liquid in the conduit 28 quickly drops to atmospheric pressure concurrently with a partial emptying of the liquid from the conduit 28. Upon a subsequent cycle, when the piston again rises and again subjects the relatively long conduit to relatively high pressure, replacement liquid rushes in and a pressure surge is likely to occur. This pressure surge or "water hammer" at best is hard on the machinery and is an annoying phenomenon. At worst it is severe enough actually to disrupt the conduit 28, a failure which stops the operation of the pumping jack.

In accordance with my invention, I provide means for precluding the "water hammer" or pressure surge in the conduit 28 due to subjection of the port 24 to alternating or varying operating pressures or other surge producing conditions. In the conduit 28 at a position closely adjacent the port 24, there is installed a check valve generally designated 41 and illustrated in detail in Figure 2. The check valve comprises a body 42 screwed into the conduit connector 27. Adapted to rest upon a valve seat 43 is a valve bobbin 44 having passageways 46 therein permitting flow through the valve body when the valve is off its seat. Flow through the body is blocked when the valve is seated. While pressure difference alone is normally sufficient to actuate the valve, I provide in addition a spring 47 urging the bobbin toward closed position. When the valve is installed in a substantially vertical position as shown in Figures 1 and 2, the spring holds the bobbin closed against the action of gravity. Suitable fittings 48 facilitate the connection of the check valve in the conduit and permit adjustment of the spring.

Since the conduit connector 27 between the cylinder 6 and the valve seat 43 is purposely made extremely short, any pressure surges therein are of such minor nature as to be negligible. The conduit 28 and its appurtenances are subject to relatively high pressure when the piston uncovers the port 24 as the valve 41 is forced open in response to the pressure increase. But when the pressure at the port 24 drops to a low value, the valve 41 immediately shuts in response to the pressure change so that the conduit 28 is not partially emptied into the cylinder 6, and there is no substantial drop in pressure therein due to such back flow. A subsequent cycle simply reopens the valve when the high pressure reoccurs and does not set up "water hammer" or pressure surges as the conduit remains filled with liquid. By the provision of a check valve 41 in each of the conduits connected with the various ports, the active one is relieved of pressure surges which might interfere with operations and all of the lines are protected from the likelihood of rupture or failure due to surges.

The pressure which is exerted through conduit 28, for example, and through the valve 34 on the pilot valve 19 is reduced in an orderly fashion or at a non-surge rate as the piston 7 approaches the bottom part of its stroke. For this purpose the cylinder 6 is also provided with a number of ports 51, 52 and 53, any one of which may be made effective, the others being held ineffective by any suitable removable blocks, not shown. For example, the port 53 freely communicates with a check valve 54 opening into the cylinder and not otherwise. All of the valves 54, 56 and 57 are joined to a common line 58 leading through a check valve 59 into the line 36.

When the piston 7 is above the active one of the ports 51, 52 and 53, the associated check valve is subjected to the pump discharge pressure and hence is closed. When the piston 7 travels below the active port 53, as shown by the dotted lines near the lower end of the cylinder 6 in Figure 1, the port 53 is then subjected to atmospheric pressure, and the check valve 54 opens a predetermined amount to afford a restricted outlet. The higher or pump pressure already in the conduit 28 and in the lines 33, 36 and 58 falls at a controlled rate as the contained liquid flows through the port 53 into the space above the piston. In this way the pressure fluctuations and flow velocities in the control conduits and lines are maintained at relatively low values so that disruptive forces do not occur. The changes in pressure, however, are rapid enough to be promptly effective upon the pilot valve 19 so that it reverses the main valve when the piston is near the bottom of its stroke and so that the cycle of operation is appropriately repeated.

In a hydraulic pumping jack of the sort wherein hydraulic force is utilized to actuate the valves and wherein the size of the cylinder is so great that the hydraulic conduits such as 28 are extremely long and are otherwise subject to surge, the provision in the combination of check valves, such as 41, adjacent the port 24 leading into the cylinder is in practice effective to avoid any difficulty from pressure surges and tube failure, and leaves the cycle of operation of the hydraulic mechanism unimpaired and in fact improved.

I claim:

A hydraulic pumping jack comprising a cylinder, a piston reciprocable therein, means for supplying oil to and withdrawing oil from one end of said cylinder, a valve for controlling said supplying and withdrawing means, a relatively long oil conduit extending from said cylinder adjacent said one end to said valve for controlling said valve in accordance with the position of said piston in said cylinder adjacent said one end thereof, a first check valve in said conduit adjacent said cylinder for preventing oil flow from said cylinder into said conduit, a second check valve in said conduit adjacent said valve for preventing oil flow from said conduit into said valve, a second relatively long oil conduit extending from said cylinder adjacent the other end thereof to said valve for controlling said valve in accordance with the position of said piston in said cylinder adjacent said other end thereof, a third check valve in said second conduit adjacent said cylinder for preventing oil flow from said second conduit into said cylinder, and a fourth check valve in said second conduit adjacent said valve for preventing oil flow from said valve into said second conduit.

LEROY D. ALWARD.

REFERENCES CITED

The following references are of record in the file of this patent:

UNITED STATES PATENTS

| Number | Name | Date |
| --- | --- | --- |
| 2,185,448 | Suter | Jan. 2, 1940 |
| 2,287,709 | Ringman | June 23, 1942 |
| 2,470,252 | Kyle | May 17, 1949 |
| 2,481,623 | Rued | Sept. 13, 1949 |
| 2,490,323 | Pounds | Dec. 6, 1949 |